United States Patent
Ito et al.

(10) Patent No.: US 7,243,208 B2
(45) Date of Patent: Jul. 10, 2007

(54) DATA PROCESSOR AND IP MODULE FOR DATA PROCESSOR

(75) Inventors: Masayuki Ito, Richmond, CA (US); Fumio Arakawa, Kodaira (JP); Mark Hill, Bath (GB)

(73) Assignee: Renesas Technology Corp., Tokyo (JP)

( * ) Notice: Subject to any disclaimer, the term of this patent is extended or adjusted under 35 U.S.C. 154(b) by 193 days.

(21) Appl. No.: 10/640,855

(22) Filed: Aug. 13, 2003

(65) Prior Publication Data

US 2005/0038973 A1    Feb. 17, 2005

(51) Int. Cl.
*G06F 12/00* (2006.01)

(52) U.S. Cl. .................. 711/207; 711/206; 713/320

(58) Field of Classification Search ............. 711/206, 711/205, 209, 212, 216, 207, 202, 203; 713/320
See application file for complete search history.

(56) References Cited

U.S. PATENT DOCUMENTS

| | | | | |
|---|---|---|---|---|
| 4,961,135 A * | 10/1990 | Uchihori | ............... | 711/207 |
| 5,193,166 A * | 3/1993 | Menasce | ............... | 711/120 |
| 5,386,527 A * | 1/1995 | Bosshart | ............... | 711/3 |
| 5,526,504 A * | 6/1996 | Hsu et al. | ............... | 711/207 |
| 5,530,823 A * | 6/1996 | Tsuchiya et al. | ........ | 711/207 |
| 5,790,979 A * | 8/1998 | Liedtke | ............... | 711/206 |
| 5,940,872 A * | 8/1999 | Hammond et al. | ........ | 711/206 |
| 5,963,984 A * | 10/1999 | Garibay et al. | ........ | 711/207 |
| 6,032,241 A * | 2/2000 | Green | ............... | 711/207 |
| 6,158,047 A * | 12/2000 | Le et al. | ............... | 717/153 |
| 6,205,531 B1 * | 3/2001 | Hussain | ............... | 711/207 |
| RE37,305 E * | 7/2001 | Chang et al. | ........... | 711/207 |
| 6,374,342 B1 * | 4/2002 | Sasahara | ............... | 711/207 |
| 6,418,520 B1 * | 7/2002 | Hayakawa et al. | ....... | 711/203 |
| 6,418,521 B1 * | 7/2002 | Mathews et al. | ......... | 711/207 |
| 6,625,714 B1 * | 9/2003 | Lyon | ............... | 711/207 |
| 6,766,434 B2 * | 7/2004 | Gaertner et al. | ......... | 711/207 |
| 6,854,046 B1 * | 2/2005 | Evans et al. | ............ | 711/203 |
| 6,859,861 B1 * | 2/2005 | Rhodes | ............... | 711/119 |
| 2003/0097394 A1 * | 5/2003 | Chauvel et al. | ......... | 709/100 |
| 2004/0162949 A1 * | 8/2004 | Scott et al. | ............ | 711/141 |
| 2005/0013183 A1 * | 1/2005 | Southwell | ............ | 365/202 |

* cited by examiner

*Primary Examiner*—Hong Kim
(74) *Attorney, Agent, or Firm*—Loudermilk & Associates

(57) ABSTRACT

In performing address translation from a virtual address space to a physical address space, when the virtual address space is divided into an area (P0), which is subjected to the address translation by TLB, and areas (P1 and P2), which are fixedly mapped to the physical address without being subjected the address translation, future extension of the physical address become difficult. A data processor comprises an address translation unit ATU that receives virtual address output from the CPU and outputs a physical address; the ATU includes a first translation lookaside buffer UTLB, a second translation lookaside buffer DTLB, a control circuit TLB_CTL that selects one of a first and a second translation lookaside buffers and performs address translation in accordance with an area of an address space in the virtual address. Since it is adapted so that the areas (P1 and P2), which are conventionally mapped fixedly by hardware, are subjected to the address translation by the DTLB, it is possible to extend a size of the physical address space later without changing the hardware.

20 Claims, 6 Drawing Sheets

DATA PROCESSOR AND IP MODULE FOR DATA PROCESSOR

FIELD OF THE INVENTION

The present invention relates to a data processor such as a microprocessor, a DSP (digital signal processor) or the like, which supports a virtual memory management system, and more particularly to techniques for use therein that are applied to memory control having a translation lookaside buffer (TLB) for address translation, and in particular a plurality of TLBs.

BACKGROUND OF THE INVENTION

Typically, the virtual memory management system in a data processor is a function devised to make effective use of the physical memory. When the required memory size for execution of a particular process is less than the available physical memory, it is possible to carry out the process by mapping to the physical memory. However, when the memory size required by the process is larger than the physical memory, the process typically has to be divided so that only selected sub-portions are mapped to the physical memory as needed.

Typically, a system in which the mapping to the physical memory is controlled and carried out as a batch by an OS (Operating System) in such a manner that the process itself is not aware of the mapping to the physical memory is called a virtual memory management system.

In a virtual memory management system, a sufficiently large virtual memory, as compared to the physical memory, is provided to allow the process to be mapped to the virtual memory. Because of this, even when a plurality of processes exist substantially simultaneously, each process operates only on the virtual memory. An MMU (Memory Management Unit), which is ordinarily controlled by the OS, is adopted for the mapping from the virtual memory to the physical memory. The MMU updates the physical memory so that virtual memory necessary for the process is mapped smoothly to the physical memory. The update of the physical memory is carried out between secondary memories. Hereinafter, an address space in the virtual memory will be referred to as virtual address space while an address space in the physical memory will be referred to as physical address space.

Although it is possible to realize the function of the MMU via software only, typically it is not efficient to carry out the translation via software every time the process accesses the physical memory. Accordingly, a translation lookaside buffer (TLB) for performing address translation is provided as part of the hardware to store frequently used address translation information. The TLB can be considered as a cache for the address translation information. When address translation is carried out from the virtual memory to the physical memory using the MMU, if the translation information has not been registered in the TLB, the MMU issues a TLB miss exception and registers new address translation information in the TLB. However, unlike the cache, when the address translation has failed, i.e., when the TLB miss exception is issued, the replacement of the address translation information is ordinarily carried out via software.

It has been determined that problems exist when it is desired to expand the physical memory in a virtual memory management system. As for the virtual memory management system, it was initially assumed that only a relatively small physical address space was desired for the virtual address space from the viewpoint of actual cost and mounting space. However, owing to the tendency of large capacity and low cost of DRAM (Dynamic Random Access Memory) typically used for main memory, it has become possible to allow a physical address space equivalent in size to the typically desired virtual address space. As a result, in certain situations it has become easier to extend the main memory as the physical address space.

FIG. 7 illustrates an example of a conventional approach involving an allocation of a virtual address space to the physical address space. In this example, the virtual address space is defined via 32 bits while the physical address space is defined via 29 bits. The size of the virtual address space depends on the bit length that handles the address. In a 32-bit microprocessor, the virtual address space is an area of 4 G bytes (or "4 GB"), i.e., the 32nd power of 2. On the other hand, the physical address space depends on the size for mounting actual memory and various bus interfaces. For example, in a microprocessor having a physical address space of 29 bits, the physical address space is an area of 512 M bytes (0.5 GB); i.e., the 29th power of 2.

A buffer in which is registered address translation information to carry out address translation from the virtual address space to the physical address space is the TLB. In the example of FIG. 7, a portion included in the area P0 (2 GB) of the virtual address space is subjected to the address translation into the physical address space of 0.5 GB by the TLB. On the other hand, since P1 and P2, which follow P0, are the areas excluded from the TLB translation, a physical address may be generated via a fixed address mapping system, whereby the upper 3 bits of the virtual address is fixed to 0. Due to this, P1 and P2 are assumed respectively to be 0.5 GB, the same as the physical address space.

The reason why P1 and P2 are assumed as the fixed address mapping system is described below. In the example of FIG. 7, it has been described above that the area of P0 is subjected to address translation by the TLB. Herein, it is presumed that a TLB miss has occurred, which indicates the fact that desired address translation information has not been registered in the TLB. In this case, the MMU generates a TLB miss exception, and the OS registers new address translation information in the TLB. The program that performs the TLB replacement is generally stored in a particular area where the virtual address is fixedly mapped in the physical address without being subjected to address translation. As an example, referring to FIG. 7, the program that performs the TLB replacement may be allocated to area P2 of the virtual address. The reason of the above is as described below. If it is adapted so that areas P1 and P2 are also subjected to the address translation by the TLB, when a TLB miss has occurred, there is a possibility that the TLB replacement program for processing the TLB miss cannot be accessed due to a new TLB miss. Thus, in the virtual address system, the particular software of the system may require a virtual address area for mapping a fixed address in the physical address.

In the conventional system of FIG. 7, based on an assumption that the physical address space maximum is 0.5 GB, the mapping of the virtual address space is determined. Since it is possible to perform a fixed address mapping from the space of P1 or P2 to any address in the physical address space of 0.5 GB, there is no limitation on the fixed address mapping. On the other hand, when the physical address space is extended from 0.5 GB in the conventional system, since only the 0.5 GB within the extended physical address space is the area that allows the fixed address mapping, it is necessary to carry out the fixed address mapping by selecting the area in the design of the hardware. However, as will be discussed in more detail below, since the area requiring the fixed address mapping varies depending on the system, it typically is necessary to customize the hardware of each system. As a result, typically it is difficult to flexibly cope with the extension of the physical address. For example, since the fixed mapping area of P1 and P2 is the hardware that sets the upper 3 bits of the virtual address to 0, the fixed mapping area of P1 and P2 is linked to 0.5 GB only at the start of the physical address. Also, although P1 and P2 have a space of 0.5 GB respectively, some applications do not need 0.5 GB for the fixed address mapping area. As will be discussed in more detail below in connection with embodiments of the present invention, if it is possible to use a page subjected to the fixed address mapping, and a page subjected to the address translation, while appropriately separating the pages from each other, it is possible to use the virtual address space more efficiently.

It is an object of the invention to provide systems and methods for a data processor capable of extending the size of, mainly, the physical address space. Another object of the invention is to provide systems and methods for ensuring that a supervisor program performing TLB replacement does not issue misses to the TLB. Furthermore, it is another object of the present invention to provide a feature allowing the users who may not use the MMU to extend the size of the physical address space.

SUMMARY OF THE INVENTION

In accordance with preferred embodiments of the present invention, a data processor preferably includes a central processing unit ("CPU") and an address translation unit ("ATU") that preferably receives a virtual addresses output from the central processing unit and outputs a physical address, wherein the address translation unit preferably includes a first translation lookaside buffer ("UTLB"), a second translation lookaside buffer ("DTLB"), and a control circuit ("TLB$_{13}$CTL") for selecting one of the first and second translation lookaside buffers and performing address translation in accordance with an area of an address space in the virtual address.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF EXEMPLARY PREFERRED EMBODIMENTS

Hereinafter, referring to the accompanying drawings, a description as to a data processor (or information processing system) and the mode of certain aspects of the preferred embodiments of the system will be made. The circuit elements constituting each block of the embodiment preferably are formed on a semiconductor substrate such as single crystal silicon by means of a technique of semiconductor integrated circuit such as well-known CMOS (complementary MOS transistor) and bipolar transistor or the like, though the elements are not particularly limited thereto. Also, the invention preferably may be realized as an intellectual property ("IP") module (either soft IP or hard IP) as all or a portion of the design data for forming a semiconductor integrated circuit. The IP module preferably is stored in an information-recording medium, and preferably may be subjected to a trade and/or transfer via a telecommunication line, data network or the like.

Figure 1:
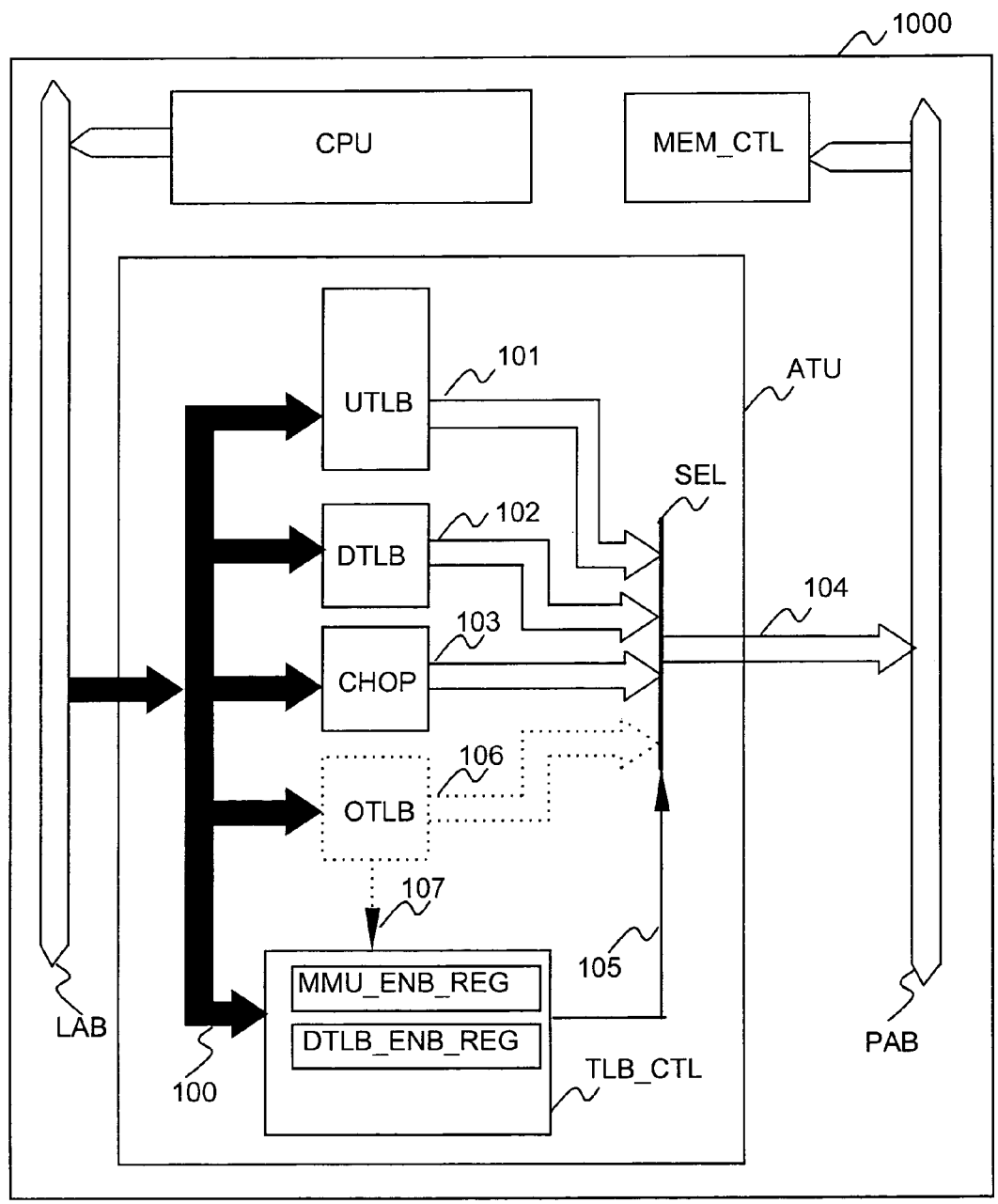
FIG. 1 is an exemplary block diagram of a data processor according to a preferred embodiment of the present invention and having a plurality of translation lookaside buffers (TLBs); utilized in accordance with certain embodiments of the present invention.

FIG. 1 illustrates an example of a data processor as an exemplary preferred embodiment of the invention. FIG. 1 is a block diagram of a data processor 1000 illustrating an address translation unit ATU according to the invention. The data processor 1000 preferably is connected to a central processing unit CPU via a logical address bus LAB, and preferably is connected to a memory controller MEM_CTL via a physical address bus PAB. The address translation unit ATU preferably includes a first translation lookaside buffer UTLB, a second translation lookaside buffer DTLB, an address chop circuit CHOP that preferably generates in a fixed manner a physical address from a virtual address, a TLB control circuit TLB_CTL that preferably controls the above, and a physical address control selector SEL. The DTLB, the TLB_CTL, and the SEL preferably are included in the address translation unit ATU. Preferably, the first translation lookaside buffer UTLB performs address translation with respect to both data access and instruction access. The third translation lookaside buffer OTLB preferably is provided as a translation lookaside buffer for operands. Reference symbol and numerals OTLB, 106, and 107 denote optional component elements for alternative embodiments as indicated with dotted lines in FIG. 1, and the description thereof will be made below.

Taking the memory access operation of the data processor 1000 as an example, a generating flow of the physical address from the virtual address will be described. The central processing unit CPU preferably includes a control unit and an execution unit, which are not shown in the figures. When performing a memory access, a virtual address 100 is issued by the CPU to the address translation unit ATU.

The TLB control circuit TLB_CTL preferably decodes a part of the virtual address 100 and determines whether (A) output signal 101 of the UTLB should be selected as the physical address using the address translation by the first translation lookaside buffer UTLB, (B) output signal 102 of DTLB should be selected as the physical address using the address translation by the second translation lookaside buffer DTLB, or (C) output signal 103 of the CHOP should be selected as physical address using the address chop circuit CHOP, to control the physical address control selector SEL. At this time, the TLB control circuit TLB_CTL also preferably refers to enable information MMU_ENB_REG of the MMU and enable information DTLB_ENB_REG of the DTLB to control the physical address control selector SEL. The generated physical address 104 preferably is sent to the memory control circuit MEM_CTL and the memory access preferably is carried out.

Figure 2:
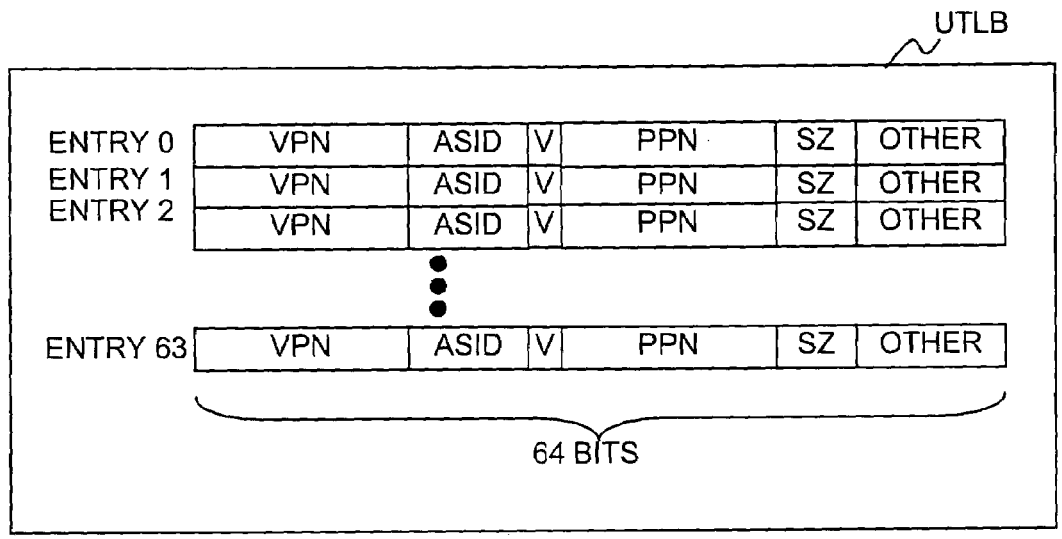
FIG. 2 is an exemplary configuration diagram of a first translation lookaside buffer, utilized in accordance with certain embodiments of the present invention.
Figure 3:
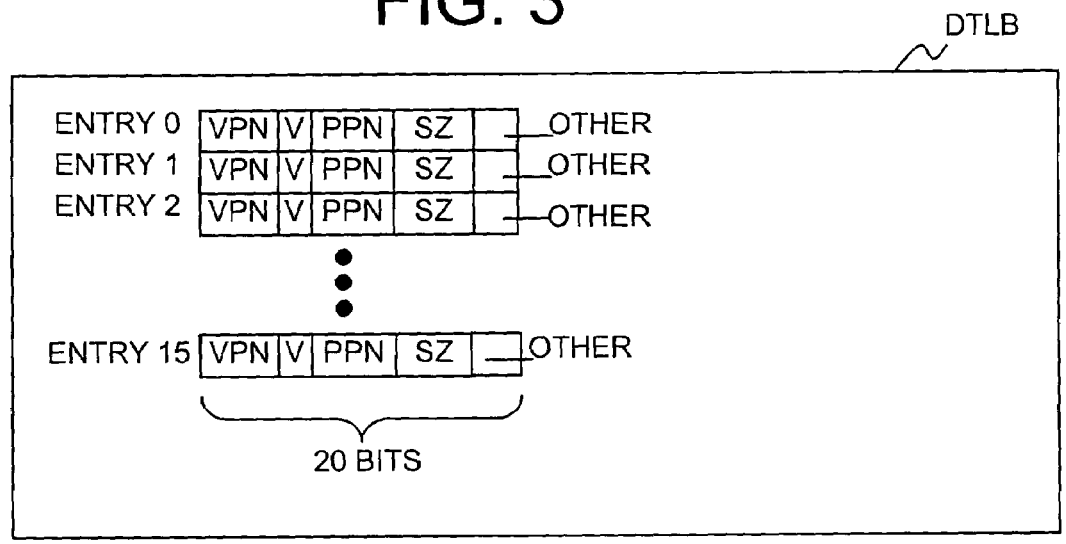
FIG. 3 is an exemplary configuration diagram of a second translation lookaside buffer, utilized in accordance with certain embodiments of the present invention.

FIG. 2 and FIG. 3 illustrate a further detailed exemplary configuration of the first translation lookaside buffer UTLB and the second translation lookaside buffer DTLB, respectively. The UTLB illustrated in FIG. 2 is a configuration of an exemplary TLB, which outputs the physical address of an entry corresponding to the compared and input virtual address 100 in accordance with the virtual address and the physical address registered via software. In accordance with an exemplary preferred embodiment of the present invention, the configuration of the TLB preferably includes 64 entries; each entry preferably includes approximately 64 bits including fields of a virtual page number (VPN), an address space identifier (ASID), a valid bit (V), a physical page number (PPN), a page size bit (SZ), and others (OTHER). Examples of OTHER include a change between cacheable and non-cacheable in units of page of the TLB, and a change between copy-back and write-through modes.

FIG. 3 illustrates a configuration of the second translation lookaside buffer DTLB in an exemplary TLB, which outputs the physical address of an entry which corresponds to the compared and input virtual address 100 in accordance with the virtual address and the physical address registered via software. Compared to the above-described UTLB, the number of the entries of the DTLB preferably is smaller. In accordance with an exemplary preferred embodiment of the present invention, the DTLB preferably includes 16 entries and each entry preferably includes approximately 20 bits. Each entry preferably includes the fields of a virtual page number (VPN), an valid bit (V), a physical page number (PPN), a page size bit (SZ), and others (OTHER). Compared to the UTLB, since the number of entries is approximately one fourth and the bits of each entry is approximately one third, it is possible to mount the DTLB in an extremely small TLB. The reason of the above is that, since the DTLB performs the mapping in a larger page unit, by adapting the page size handled by the TLBs to be different between the UTLB and the DTLB the number of the entries can be smaller, and furthermore, the field width of the VPN and the PPN included in each entry can be smaller.

The address chop circuit CHOP in FIG. 1, in accordance with an exemplary preferred embodiment of the present invention, preferably outputs virtual address 100 as the physical address 103, and preferably has a function by which unnecessary upper bits generated due to a difference in size between the virtual address space and the physical address space are set to 0. As an example which will be described later with regards to FIG. 5, a virtual address space of 4 GB can be mapped to a physical address space of 0.5 GB, the CHOP is a module that preferably sets the upper 3 bits of the 32 bits to 0 while the lower 29 bits therefrom preferably are output as the physical address. Generally, in accordance with such embodiments, the described operation of the CHOP is a function inherent in the hardware, i.e., the CHOP maps a virtual address space area fixedly to a physical address space area via the hardware.

Figure 4:
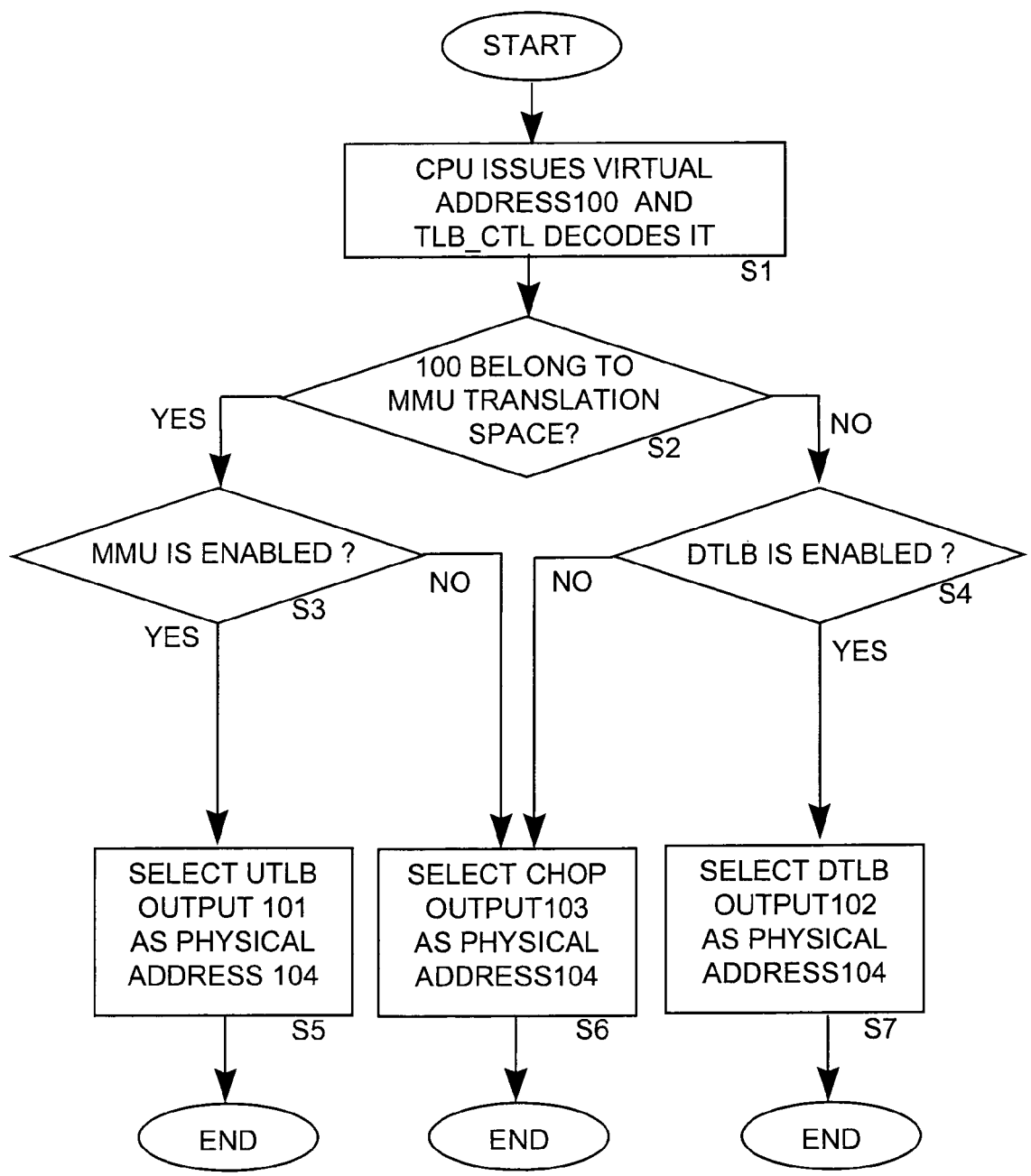
FIG. 4 is an exemplary flowchart of physical address generation, utilized in accordance with certain embodiments of the present invention.

FIG. 4 is an exemplary flowchart that determines, based on the virtual address issued from the CPU (e.g., in accordance with the control of TLB control circuit TLB_CTL) in what manner the physical address should be generated, i.e., by the first translation lookaside buffer UTLB, the second translation lookaside buffer DTLB, or the CHOP.

The TLB control circuit TLB_CTL preferably decodes the upper bits of the virtual address output from the CPU, and determines the area (e.g., any one of P0, P1, and P2 or the like) in the virtual address (S1). If the virtual address 100 is within an area which is subjected to the address translation by the MMU (e.g., within P0 in the example of FIG. 5, which will be described further below), and if the MMU is enabled (e.g., MMU_ENB_REG in the TLB_CTL is set to "enable"), the TLB control circuit TLB_CTL preferably selects the output signal 101 of the UTLB as the physical address 104 (i.e., S2, S3, and S5). If the virtual address 100 is not within an area which is subjected to the address translation by the MMU (e.g., within P1 and P2 in the example of FIG. 5, which will be described further below), and if the DTLB is enabled (e.g., when the DTLB_ENB_REG in the TLB_CTL is set to "enable"), the output signal 102 of the DTLB preferably is selected as the physical address 104 (i.e., S2, S4, and S7). In other cases, the output signal 103 of the CHOP preferably is selected as the physical address 104 (i.e., S6). Note that, immediately after resetting the data processor 1000, when the MMU and the DTLB are not enabled, since no translation information is set in the TLB, a physical address preferably is generated fixedly by the CHOP output.

FIG. 4 illustrates an example in which the physical address preferably is selected via the control of the TLB_CTL after both of the UTLB and the DTLB have carried out the address translation. However, since the TLB_CTL preferably detects which of the UTLB and the DTLB is selected, low power control may be adopted by carrying out such control so that only the necessary TLB is activated. Thus, in alternative embodiments, the TLB_CTL may be coupled to the UTLB and DTLB to selectively activate the UTLB or the DTLB when the output thereof is to be selected to generate the physical address.

Figure 5:
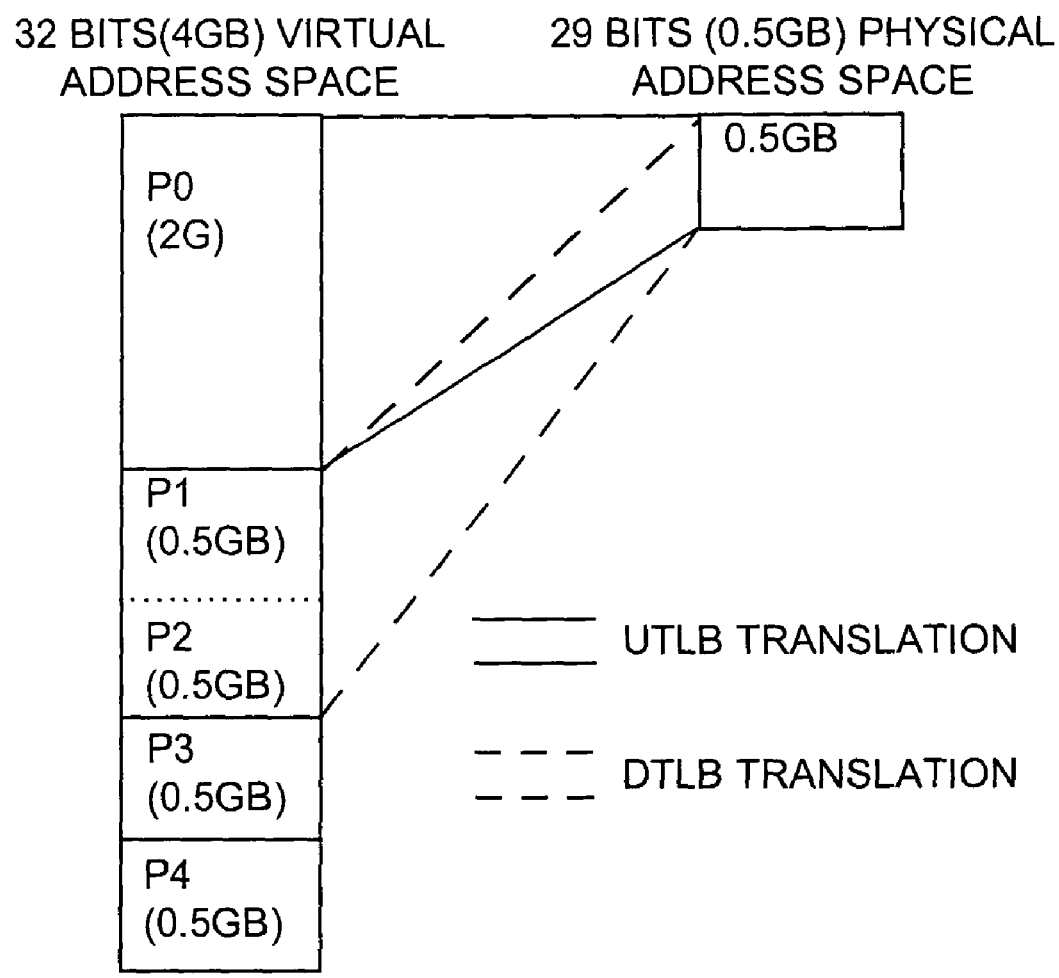
FIG. 5 is an exemplary diagram mapping from a 32-bit virtual address space to a 29-bit physical address space, utilized in accordance with certain embodiments of the present invention.

FIG. 5 illustrates a 32-bit virtual address space mapped to a 29-bit physical address space as an example in accordance with one exemplary preferred embodiment of the present invention. In the address translation system illustrated in FIG. 5, area P0 of 2 G bytes is the area to be subjected to UTLB translation, and the following areas P1 and P2 of 0.5 G bytes are areas to be subjected to DTLB translation. Due in part to the second translation lookaside buffer DTLB (which is provided in accordance with the present invention), the address translation of areas P1 and P2 is carried out in accordance with the contents registered in the DTLB without being limited to fixed mapping. Compared to the conventional example illustrated in FIG. 7, in which areas P1 and P2 are mapped fixedly to the physical address space, certain benefits of the present invention are achieved as compared with the conventional approach.

By allowing the logical address of a supervisor program (e.g., address translation miss handling routine), which performs replacement of the TLB, as well as allowing the DTLB entry, which is used to translate the logical address of an address translation table or the like which the supervisor program accesses, to be resident in the physical address, it is possible to avoid TLB misses during the execution of TLB replacement via the supervisor program. That is to say, control of the entries of the DTLB is made so that the physical address, which is stored in the DTLB entries, is not rewritten even when the second translation lookaside buffer issues an address translation miss. For example, a typical address translation table may be allocated with approximately 8 bytes per page; assuming that one page is 4 KB, a capacity of 1 MB is required for the physical address of 0.5 GB. Since the page size of the DTLB is the range from 16 MB to 0.5 GB, it is possible to allow this amount to be resident in one entry. However, in the case that one page is 4 KB, 256 entries are required to allow this amount to be resident, which may not be practical since a large-capacity TLB is required.

As for the parts of areas P1 and P2 of the above-described TLB (which are not used for the replacement), because in certain examples it is not always necessary to avoid any TLB misses, the areas may be subjected to the address translation. In these examples, the remaining entries not allowed to rewrite a physical address that may be stored upon an address translation miss of the DTLB preferably are allowed to rewrite a physical address that may be stored in the entries upon an address translation miss. Accordingly, by utilizing a large page size of the DTLB, it is possible to make the DTLB to perform a function to complement the UTLB, which preferably is able to perform a finer degree of mapping.

Figure 7:
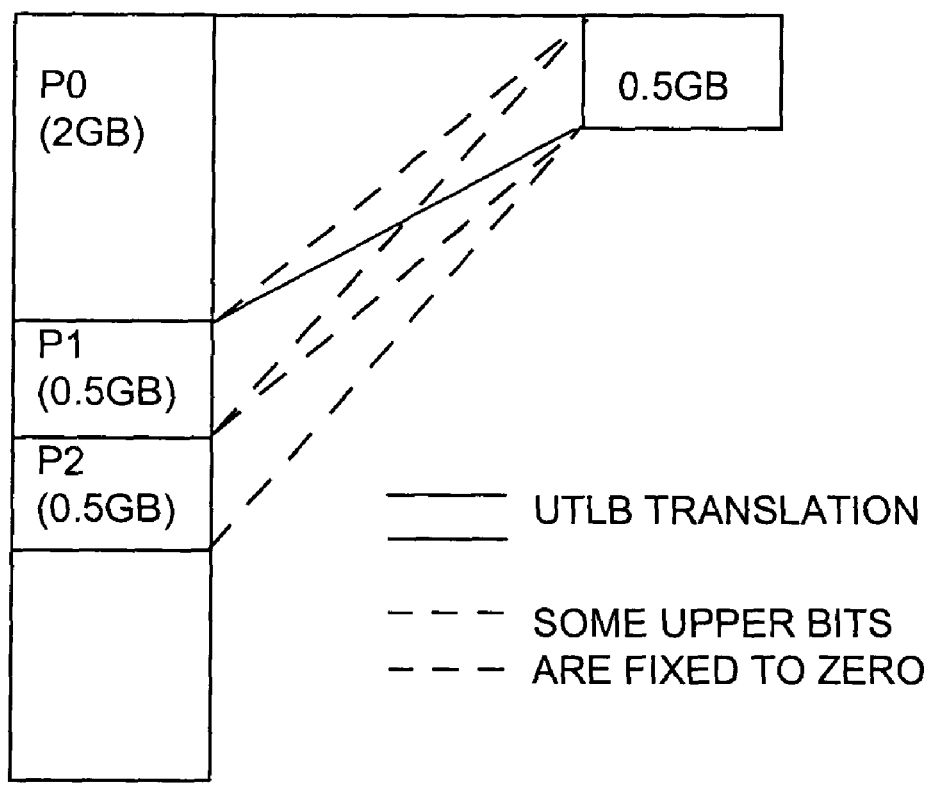
FIG. 7 is an exemplary diagram mapping from a 32-bit virtual address space to a 29-bit physical address space, in accordance with the prior art.

In the prior art example illustrated in FIG. 7, area P1 is a cacheable area (which makes use of the cache), while area P2 is a non-cacheable area (which does not use the cache). In this example, both of areas P1 and P2 are subjected to a fixed address mapping. However, in the case of the DTLB in accordance with the present invention, by assigning a cacheable attribute to the OTHER field of the DTLB, it is possible to control the DTLB while preferably distinguishing between a cacheable area and a non-cacheable area (e.g., which does not use the cache) to a finer degree; i.e., in units of pages that are subjected to the address translation by the DTLB.

In FIG. 5, areas P3 and P4 preferably are further included. P3 preferably is an area subjected to address translation by the UTLB, and preferably is handled in the same manner as area P0. On the other hand, area P4 preferably is an area subjected to address translation by the DTLB, and accordingly it preferably is handled in the same manner as areas P1 and P2. In FIG. 5, the relationship of the address mapping of P3 and P4 is omitted for purposes of clarity.

Figure 6:
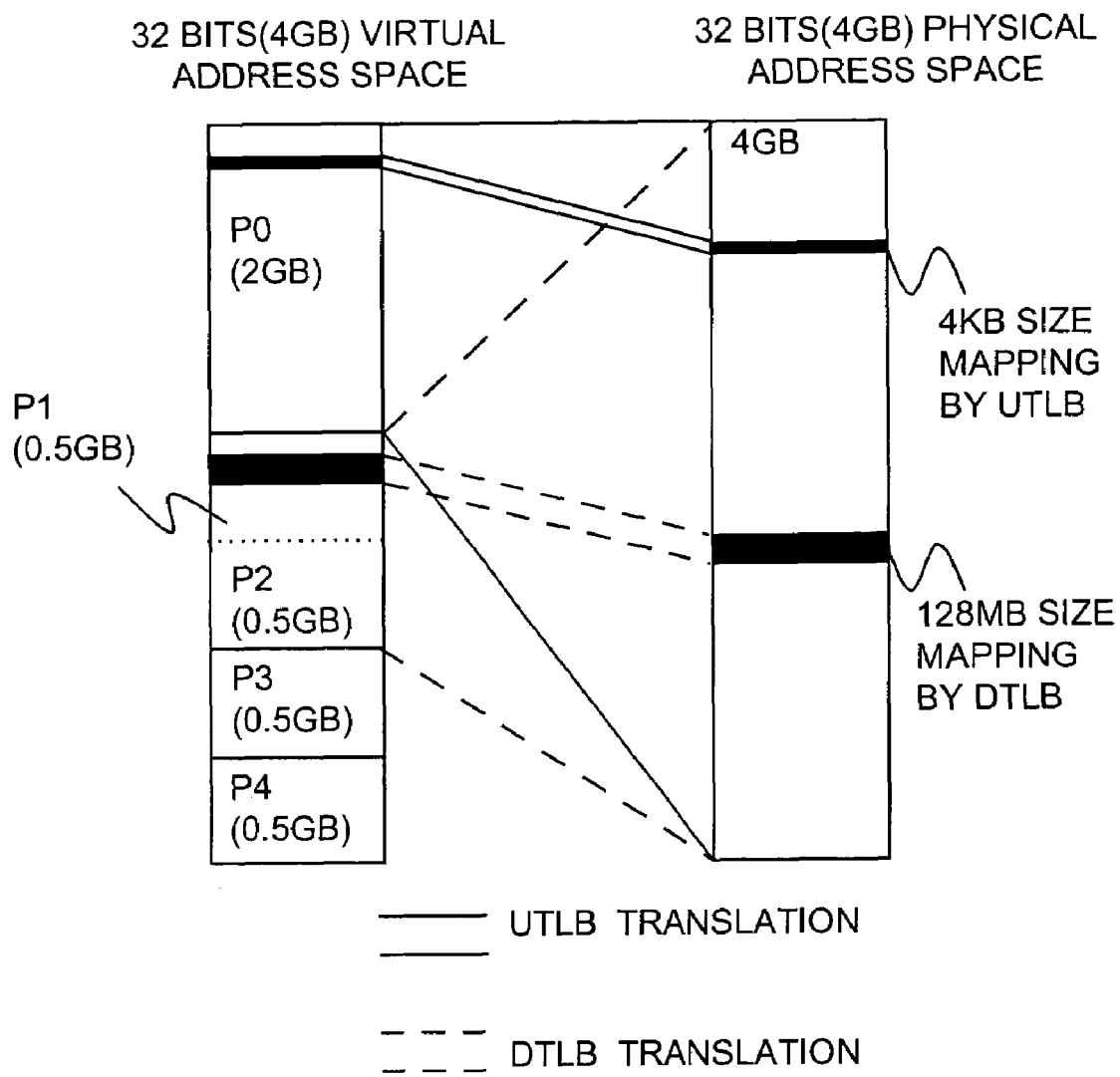
FIG. 6 is an exemplary diagram mapping from a 32-bit virtual address space to a 32-bit physical address space, utilized in accordance with certain embodiments of the present invention.

FIG. 6 illustrates mapping from a 32-bit virtual address space to a 32-bit physical address space as an example of other embodiments of the present invention. In the address translation method illustrated in FIG. 6, similarly to the previously described FIG. 5, area P0 of 2 G bytes is the area that is subjected to UTLB translation; the following areas P1 and P2 of 0.5 G bytes respectively are the areas that are subjected to DTLB translation. Because of the use of the DTLB, it is possible to carry out the mapping from the virtual address spaces of 1 G bytes (including areas P1 and P2) to the physical address space of 4 G bytes. An example of the mapping of the UTLB and the DTLB is illustrated in FIG. 6. In this example, although the mapping by the UTLB is mapping of a page size of 4 KB, it is shown that a larger area mapping (a large area of 128 MB, for example, which is equivalent to a quarter of the area of P1, is mapped via one entry) is carried out by the DTLB. In n this physical address space example, various kinds of spaces such as main memory space (e.g., SDRAM or the like), boot ROM space, PCI space, I/O space and coprocessor space or the like are included, and each may be a space of varying size from several kilobytes to several gigabytes. By providing the DTLB with various page sizes and entries of sufficient number to cover the areas of P1 and P2, it is possible to allow all mapping information of the areas of the respective spaces (necessary for fixed mapping) to be resident in the DTLB. Further, in a configuration in which an MMU is not used, it is possible to adopt a system in which area P0 of 2 G bytes is mapped to the physical address space of 2 G bytes while the areas of 1 G bytes (including P1 and P2 areas) are mapped to the physical address space of 2 G bytes using the DTLB.

The areas P3 and P4 in FIG. 6 preferably are handled in the same manner as areas P3 and P4 described in conjunction with FIG. 5. For clarity, the corresponding relationship of the address mapping of areas P3 and P4 are not shown in FIG. 6.

In accordance with certain alternative embodiments of the present invention, data processor may be provided that has a configuration that includes a micro translation lookaside buffer for operand OTLB (an example of which is illustrated in FIG. 1 marked with the dotted line). In certain situations when it may be difficult to use a UTLB (e.g., due to a problem of electric power or speed), a micro TLB may be used. Although a mode wherein the UTLB and the DTLB have a micro TLB may be the simplest mode, in the example shown in FIG. 1, the OTLB as a micro TLB excludes the need for the micro TLB for the DTLB. That is to say, (1) since the micro TLB is of a small capacity, even when the functions of both the UTLB and the DTLB are incorporated, there preferably are no problems in terms of speed; (2) since the micro TLB is a copy of the UTLB and the DTLB, it is renewed automatically by the hardware when any miss has occurred; and (3) even when the copy of the DTLB does not reside in the OTLB, since the necessary entry can be copied from the DTLB by the hardware, another TLB miss does not occur. Accordingly, even when a copy of the DTLB is held, the OTLB may be a typical TLB as it is, in which preferably a TLB miss is allowed. When a large page size is provided to the DTLB but not to the UTLB, an OTLB in accordance with the present invention, is obtained.

The practical operation of the OTLB shown in FIG. 1 is as described below. As in the case that the OTLB is not used, the central processing unit CPU issues a virtual address 100 to the address translation unit ATU. The first translation lookaside buffer UTLB, the second translation lookaside buffer DTLB, the address chop circuit CHOP, and the micro translation lookaside buffer for operand OTLB, preferably translate the virtual address 100 into a physical address. When the OTLB is hit, the TLB control circuit TLB_CTL preferably selects an OTLB output 106 responding to a hit signal 107. If a miss occurs, the output from the UTLB, the DTLB, or the CHOP preferably is selected as the physical address based in part on the decode result of a part of the virtual address 100. In order to reduce power consumption, only when an OTLB miss has occurred, certain aspects of the present invention make it possible to make one or more of the other translation lookaside buffers operate. In additional variations, one or more of the other translation lookaside buffers is made to operate by decoding the virtual address 100 beforehand. Upon an OTLB miss, in preparation for the next access, the hit entry of the UTLB or the DTLB preferably is copied to the OTLB. At this time, based on an algorithm of an LRU (i.e., the least recently used entry is subjected to the replacement) or the like, an object to be subjected to replacement preferably is selected. When a miss has occurred for both the OLTB and the UTLB, a TLB miss exception preferably is generated. As described above, the miss preferably does not occur for the DTLB.

Although certain embodiments in which the invention is applied to a micro translation lookaside buffer for operand OTLB (e.g., as shown in FIG. 1), it is possible to apply certain aspects of the present invention to a micro translation lookaside buffer for an instruction ITLB. In this case, while responding to an instruction fetch operation of the central processing unit CPU, the ITLB preferably is made to operate selectively, and preferably is allowed to operate address translation processing in parallel with the UTLB and the DTLB. In part because of this, the address translation at the instruction fetch operation preferably can be carried out at a higher speed.

Based on certain features of the embodiments described herein, the effect obtained because of the invention disclosed in this application will be described briefly below.

By using the first translation lookaside buffer UTLB and the second translation lookaside buffer DTLB separately depending on the area of the virtual address (e.g., as shown in FIG. 1), the UTLB preferably undertakes the function of the TLB in the conventional technique while the DTLB preferably undertakes a function that substitutes for the conventional technique where the physical address is generated in a manner of fixed mapping. By programming the DTLB, a supervisor program area (typified by a program for performing replacement of the TLB), preferably can generate the physical address to the TLB in accordance with the registered address translation information without causing any misses. In prior art approaches, since the area other than the area which is subjected to the TLB translation is subjected to the fixed mapping by hardware, it typically is impossible to extend/upgrade the size of the physical address space later without changing the hardware on the processor core. However, in the presently describes techniques using the DTLB according to the invention, it is possible to extend/upgrade the size of the physical address space later without changing the hardware of the processor since it is possible to program the DTLB. Furthermore, it is not always necessary that the first translation lookaside buffer UTLB and the second translation lookaside buffer DTLB handle the same page size. Since the DTLB preferably can perform the mapping of the virtual address space to the physical address space in a larger unit, it is possible to reduce the number of the entries of the DTLB. Accordingly, since it is possible to reduce the number of the address translation bits held by the DTLB by performing the mapping in a larger unit, it is possible to largely reduce the size of the hardware necessary for mounting the DTLB compared to the ordinary TLB, and at the same time, it is possible to generate the physical address at a higher speed.

Also, by stratifying the TLB, even when a configuration having a micro TLB (e.g., with a small number of entries for instruction fetch or operand access), the technique according to the invention is applicable in the same manner as described above. Even when pages with different sizes are handled by the UTLB and the DTLB, preferably it is possible for the micro TLB to hold entries from both of the UTLB and the DTLB in a mixed manner.

By employing a processor core using a DTLB according to certain aspects of the present invention, users who do not use the MMU preferably can also utilize a benefit owing to the extension of the physical address space size.

Furthermore, by providing associated information to the OTHER field of the DTLB, it preferably is possible to perform various controls more flexibly. For example, it is possible to control the switching between cacheable and non-cacheable, between copy-back and write-through, or the like. In certain prior art approaches the page size unit of the DTLB might determine these characteristics in a larger space unit.

A processor core having a 32-bit virtual address space, to which the system of the invention is applied, is a processor core preferably having a large flexibility in the address translation method. In addition to the examples illustrated in FIG. 5 and FIG. 6, it is applicable to a 30-bit-1 GB physical address space and a 31-bit-2 GB physical address space. As demonstrated in the above description, when developing a system mounted with a processor core, in which an address translation unit according to the invention is adopted, it preferably is possible to determine a suitable size of the physical address space and the address map of the system during a development phase irrespective of the hardware features within the processor core. It is therefore possible to prepare a very flexible processor core.

According to the invention, it is possible to extend the physical address space in a data processor of a virtual memory management system easily.

As will be understood by a person of ordinary skill in the present art, the examples discussed here are representative of the full spirit and scope of the present invention. Additional variations, some of which are described here, incorporate many aspects of the present invention.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A data processor, comprising:
   a central processing unit; and
   an address translation unit that receives virtual addresses output from the central processing unit and outputs physical addresses;
   wherein the address translation unit includes a first translation lookaside buffer, a second translation lookaside buffer, and a control circuit for selecting one of the first and second translation lookaside buffers,
   wherein the control circuit selectively controls operation of the first and second translation lookaside buffers to selectively output a physical address based on stored enable information,
   wherein the control circuit includes storage for storing the stored enable information and a selector coupled to outputs of the first translation lookaside buffer and the second translation lookaside buffer,
   wherein the selector selectively operates to output the physical address based on the stored enable information,
   wherein upon reset of the date processor the stored enable information controls the selector so that it does not output any physical address from either the first translation lookaside buffer or the second translation lookaside buffer, wherein the address translation unit performs address translation in accordance with an area of a virtual address space of a virtual address received from the central processing unit.

2. A data processor according to claim 1, wherein each of the first and second translation lookaside buffers has a plurality of entries for holding physical addresses associated with respective virtual addresses for performing the address translation, wherein the central processing unit is capable of accessing a first virtual address space and a second virtual address space included in the virtual address space, wherein the first translation lookaside buffer translates a virtual address of the first virtual address space to a physical address, and wherein the second translation lookaside buffer translates a virtual address of the second virtual address space to a physical address.

3. A data processor according to claim 1, wherein the control circuit decodes upper bits of a virtual address output from the central processing unit and selects one of the first and second translation lookaside buffers in accordance with a decode result.

4. A data processor according to claim 1, wherein the address translation unit further includes a selection circuit to which a first output of the first translation lookaside buffer and a second output of the second translation lookaside buffer are input, wherein the selection circuit selects one of the first and second outputs in accordance with a control signal of the control circuit.

5. A data processor according to claim 1, wherein the address translation unit further includes an address chop circuit that fixedly forms a physical address from a virtual address when both of the first and second translation lookaside buffers are disabled.

6. A data processor according to claim 1, wherein a page size of the first translation lookaside buffer is different from a size of the second translation lookaside buffer.

7. A data processor, comprising:

a central processing unit; and an address translation unit that receives virtual addresses output from the central processing unit and outputs physical addresses;

wherein the address translation unit includes a first translation lookaside buffer, a second translation lookaside buffer, and a control circuit for selecting one of the first and second translation lookaside buffers, wherein the control circuit selects one of the first and second translation lookaside buffers to output a physical address based on stored enable information, wherein the address translation unit performs address translation in accordance with an area of a virtual address space of a virtual address received from the central processing unit, wherein each of the first and second translation lookaside buffers has a plurality of entries for holding physical addresses associated with respective virtual addresses for performing the address translation, wherein the central processing unit is capable of accessing a first virtual address space and a second virtual address space included in the virtual address space, wherein the first translation lookaside buffer translates a virtual address of the first virtual address space to a physical address, wherein the second translation lookaside buffer translates a virtual address of the second virtual address space to a physical address, wherein first entries of the plurality of entries in the second translation lookaside buffer are controlled to be disabled from rewriting if the second translation lookaside buffer detects an address translation miss, and wherein second entries of the plurality of entries in the second translation lookaside buffer are controlled to be enabled for rewriting if the second translation lookaside buffer detects an address translation miss.

8. A data processor according to claim 7, wherein the first entries store physical addresses for an address translation miss handling routine.

9. A data processor according to claim 8, wherein it is determined whether or not the plurality of entries in the second translation lookaside buffer should be rewritten at an address translation miss in accordance with the address translation miss handling routine.

10. A data processor, comprising:

a central processing unit; and an address translation unit that receives virtual addresses output from the central processing unit and outputs physical addresses;

wherein the address translation unit includes a first translation lookaside buffer, a second translation lookaside buffer, and a control circuit for selecting one of the first and second translation lookaside buffers, wherein the control circuit selects one of the first and second translation lookaside buffers to output a physical address based on stored enable information, wherein the address translation unit performs address translation in accordance with an area of a virtual address space of a virtual address received from the central processing unit, wherein each of the first and second translation lookaside buffers has a plurality of entries for holding physical addresses associated with respective virtual addresses for performing the address translation, wherein the central processing unit is capable of accessing a first virtual address space and a second virtual address space included in the virtual address space, wherein the first translation lookaside buffer translates a virtual address of the first virtual address space to a physical address, wherein the second translation lookaside buffer translates a virtual address of the second virtual address space to a physical address, wherein the number of the plurality of entries included in the first translation lookaside buffer is adapted so as to be larger than the number of the plurality of entries included in the second translation lookaside buffer, and wherein a page size when the first translation lookaside buffer translates the virtual address of the first virtual address space to the physical address is adapted so as to be smaller than a page size when the second translation lookaside buffer translates the virtual address of the second virtual address space to the physical address.

11. A data processor, comprising:
a central processing unit; and
an address translation unit that receives virtual addresses output from the central processing unit and outputs physical addresses;
wherein the address translation unit includes a first translation lookaside buffer, a second translation lookaside buffer, and a control circuit for selecting one of the first and second translation lookaside buffers, wherein the control circuit selects one of the first and second translation lookaside buffers to output a physical address based on stored enable information,
wherein the address translation unit performs address translation in accordance with an area of a virtual address space of a virtual address received from the central processing unit,
wherein each of the first and second translation lookaside buffers has a plurality of entries for holding physical addresses associated with respective virtual addresses for performing the address translation,
wherein the central processing unit is capable of accessing a first virtual address space and a second virtual address space included in the virtual address space,
wherein the first translation lookaside buffer translates a virtual address of the first virtual address space to a physical address,
wherein the second translation lookaside buffer translates a virtual address of the second virtual address space to a physical address,
wherein the address translation unit further includes a third translation lookaside buffer having a plurality of entries for holding predetermined physical addresses associated with predetermined virtual addresses for performing address translation, and
wherein the plurality of entries of the third translation lookaside buffer are capable of storing both a copy of a part of the entries of the plurality of entries in the first address buffer and a copy of a part of the entries of the plurality of entries in the second address buffer.

12. A data processor according to claim 11,
wherein the third address buffer is capable of operating selectively in accordance with an instruction fetch operation of the central processing unit so as to perform address translation processing in parallel with the first and second translation lookaside buffers.

13. A data processor, comprising:
a central processing unit; and
an address translation unit that receives virtual addresses output from the central processing unit and outputs physical addresses;
wherein the address translation unit includes a first translation lookaside buffer for performing address translation of a first virtual address space in the virtual addresses, a second translation lookaside buffer for performing address translation of a second virtual address space in the virtual addresses, and a control circuit for selecting one of the first and second translation lookaside buffers in accordance with whether a virtual address output from the central processing unit is in the first virtual address space or the second virtual address space,
wherein the control circuit selectively controls operation of the first and second translation lookaside buffers to selectively output a physical address based on stored enable information
wherein the control circuit includes storage for storing the stored enable information and a selector coupled to outputs of the first translation lookaside buffer and the second translation lookaside buffer,
wherein the selector selectively operates to output the physical address based on the stored enable information,
wherein upon reset of the date processor the stored enable information controls the selector so that it does not output any physical address from either the first translation lookaside buffer or the second translation lookaside buffer.

14. A data processor according to claim 13,
wherein each of the first and second translation lookaside buffers includes a plurality of entries for holding physical addresses respectively associated with virtual addresses for performing address translation.

15. A data processor according to claim 13,
wherein the second translation lookaside buffer includes entries for an address translation miss handling routine of the first translation lookaside buffer, wherein the entries for the address translation miss handling routine are disabled from rewriting.

16. A design data module including information of a microprocessor module, comprising:
data for defining an address translation unit for receiving virtual addresses output from a central processing unit and outputting physical addresses,
wherein the address translation unit includes a first translation lookaside buffer, a second translation lookaside buffer, and a control circuit for selecting one of the first and second translation lookaside buffers,
wherein the address translation unit performs address translation in accordance with an area of a virtual address space of a virtual address received from the central processing unit,
wherein the control circuit selectively controls operation of the first and second translation lookaside buffers to selectively output a physical address based on stored enable information
wherein the control circuit includes storage for storing the stored enable information and a selector coupled to outputs of the first translation lookaside buffer and the second translation lookaside buffer,
wherein the selector selectively operates to output the physical address based on the stored enable information,
wherein upon reset of the date processor the stored enable information controls the selector so that it does not output any physical address from either the first translation lookaside buffer or the second translation lookaside buffer.

17. A design data module according to claim 16,
wherein each of the first and second translation lookaside buffers has a plurality of entries for holding physical addresses associated with respective virtual addresses for performing the address translation,
wherein the central processing unit is capable of accessing a first virtual address space and a second virtual address space included in the virtual address space,
wherein the first translation lookaside buffer translates a virtual address of the first virtual address space to a physical address, and
wherein the second translation lookaside buffer translates a virtual address of the second virtual address space to a physical address.

18. A design data module including information of a microprocessor module, comprising:

data for defining an address translation unit for receiving virtual addresses output from a central processing unit and outputting physical addresses, wherein the address translation unit includes a first translation lookaside buffer, a second translation lookaside buffer, and a control circuit for selecting one of the first and second translation lookaside buffers, wherein the address translation unit performs address translation in accordance with an area of a virtual address space of a virtual address received from the central processing unit, wherein the control circuit selects one of the first and second translation lookaside buffers to output a physical address based on stored enable information, wherein each of the first and second translation lookaside buffers has a plurality of entries for holding physical addresses associated with respective virtual addresses for performing the address translation, wherein the central processing unit is capable of accessing a first virtual address space and a second virtual address space included in the virtual address space, wherein the first translation lookaside buffer translates a virtual address of the first virtual address space to a physical address, and wherein the second translation lookaside buffer translates a virtual address of the second virtual address space to a physical address, wherein first entries of the plurality of entries in the second translation lookaside buffer are controlled to be disabled from rewriting if the second translation lookaside buffer detects an address translation miss, and wherein second entries of the plurality of entries in the second translation lookaside buffer are controlled to be enabled for rewriting if the second translation lookaside buffer detects an address translation miss.

19. A data processor according to claim 1, wherein the control circuit selectively activates the first and second address translation lookaside buffers, wherein power consumption of the data processor is selectively controlled.

20. A data processor according to claim 10, wherein the control circuit selectively activates the first and second address translation lookaside buffers, wherein power consumption of the data processor is selectively controlled.

* * * * *